United States Patent [19]

Ressler

[11] 4,167,112
[45] Sep. 11, 1979

[54] MACHINE FOR TESTING ANEURYSM CLIPS

[75] Inventor: Erhard O. Ressler, New Braunfels, Tex.

[73] Assignee: Kees Surgical Specialty Co., Wilder, Ky.

[21] Appl. No.: 960,235

[22] Filed: Nov. 13, 1978

[51] Int. Cl.² ............................................. G01L 1/04
[52] U.S. Cl. ..................................................... 73/161
[58] Field of Search ......................................... 73/161

[56] References Cited

U.S. PATENT DOCUMENTS

| | | | |
|---|---|---|---|
| 2,272,921 | 2/1942 | Paulson | 73/161 |
| 2,616,292 | 11/1952 | Malm | 73/161 |
| 2,789,430 | 4/1957 | Sinclaire | 73/161 |

Primary Examiner—Donald O. Woodiel
Attorney, Agent, or Firm—James W. Pearce; Roy F. Schaeperklaus

[57] ABSTRACT

A machine for testing the force applied to jaws of an aneurysm clip. A pair of jaw support plates receive the jaws of the aneurysm clip on end portions thereof. One of the jaw support plates moves between a closed position and an open position in which the end portions of the jaw support plates are spaced so that the clip is open. A motor opens said one of the jaw support plates. Electric current supplied to the motor is measured to provide a measure of the force on the jaws of the clip.

5 Claims, 4 Drawing Figures

MACHINE FOR TESTING ANEURYSM CLIPS

This invention relates to a machine for testing aneurysm clips.

A spring of an aneurysm clip must have sufficient power to close jaws thereof with sufficient force that a blood vessel on which the clip is mounted can be completely closed. However, the clip should not exert more force than is necessary as excessive force on the jaws can cause injury to the blood vessel.

An object of this invention is to provide a machine which measures the force with which jaws of an aneurysm clip are forced together.

A further object of this invention is to provide such a machine which measures the force while the clip is being opened and closed in order to provide a measure of dynamic force of the clip.

A further object of this invention is to provide such a device which can measure the force exerted on the jaws of the clip either near the ends thereof, spaced from the ends, or at locations in between.

Briefly, this invention provides a clip testing machine having plates on which jaws of the clip are mounted. One of the jaws is advanced away from the other by an electrically powered device such as a torque motor. Circuitry of the machine supplies sufficient power to the torque motor to cause opening of the clip. The circuit measures power supplied to the motor, which provides a measure of the force exerted by the clip.

The above and other objects and features of the invention will be apparent to those skilled in the art to which this invention pertains from the following detailed description and the drawings, in which.

In the following detailed description and the drawings, like reference characters indicate like parts.

Figure 1:
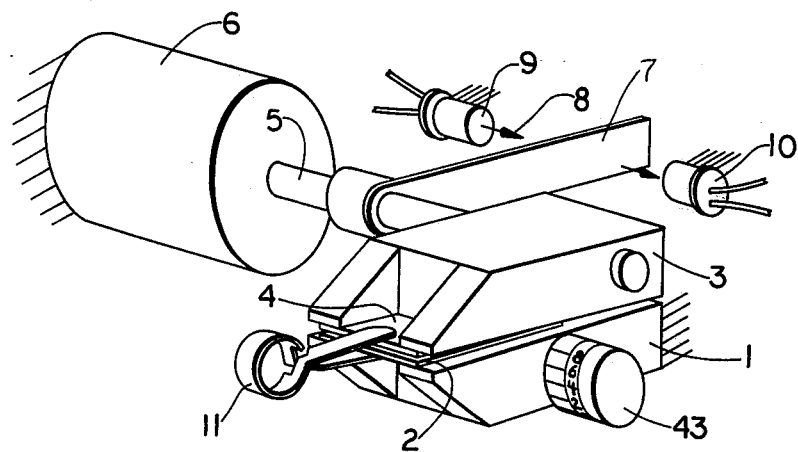
FIG. 1 is a perspective, somewhat schematic view showing a clip testing machine constructed in accordance with an embodiment of this invention, an aneurysm clip being shown mounted thereon.

In FIG. 1 is shown a clip testing machine which includes a stationary platform carrier 1, to which is adhesively attached a lower platform 2, and a rotatively mounted moving platform carrier 3, to which is adhesively attached an upper platform 4. The platforms 2 and 4 typically are thin but rigid stainless steel blades.

The moving platform carrier 3 is rigidly attached to a shaft 5 of a torque motor 6. The shaft 5 also carries a shutter arm 7. The shutter arm 7 provides partial shuttering of a light beam 8 which emanates from a stationary light source 9 and is directed toward a stationary light sensor 10.

Figure 2:
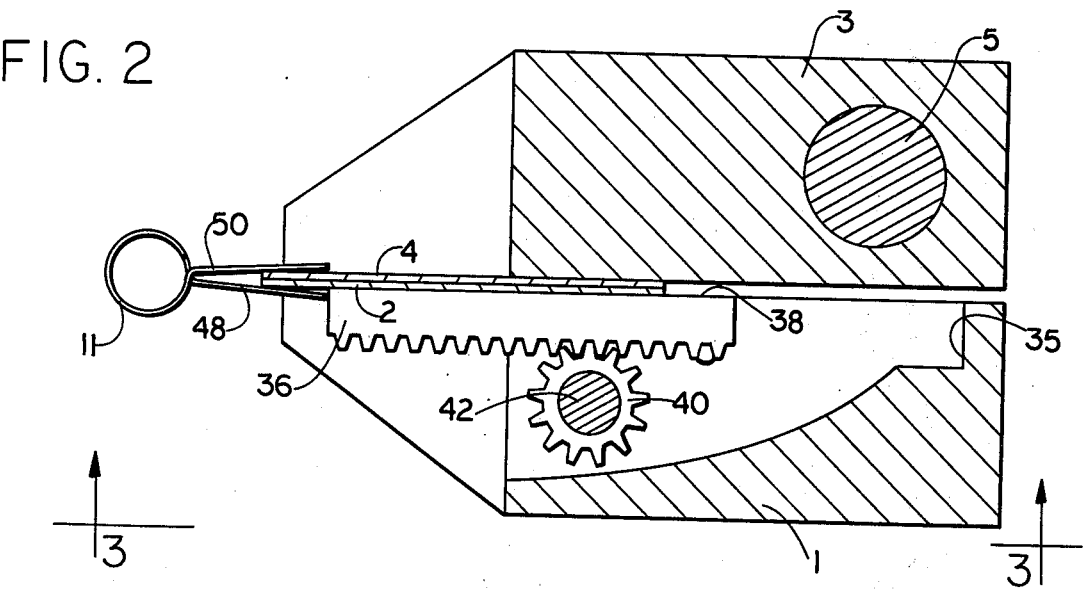
FIG. 2 is a view in upright section through platform carriers of the machine showing the clip in position thereon.
Figure 3:
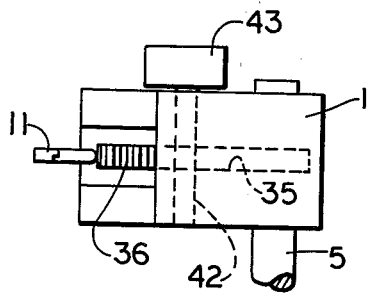
FIG. 3 is a fragmentary bottom plan view looking in the direction of the arrows 3—3 in FIG. 2.

A typical aneurysm clip 11 can be mounted on the platforms 2 and 4 as shown in FIGS. 1-3 inclusive.

The stationary platform carrier 1 can be attached to a front panel of a cabinet (not shown) while the moving platform carrier 3 can rotate with shaft 5. The shaft 5 can protrude through an opening (not shown) in the front panel. The torque motor 6, the light source 9 and the light sensor 10 can be mounted in the cabinet. A direct current voltmeter 12 (FIG. 4) can be mounted on the front panel. As will be explained more fully hereinafter, the voltmeter 12 can be arranged to provide a reading of the clamping force of the aneurysm clip 11.

When no aneurysm clip is mounted on the platforms 2 and 4, a no-load dynamic equilibrium can exist such that a small space which can be about 1/100 inch can be maintained between the upper platform 4 and the lower platform 2. For this purpose, the gravitational forces acting on the shaft 5 of the torque motor 6 can be balanced by an appropriate counterweight (not shown) attached to the shutter arm 7. In this gravitationally balanced condition, and with the approximate platform spacing, a dynamic equilibrium is maintained by action of the circuit (to be described hereinafter) between the relative position of the shutter arm 7 with respect to the light beam 8 and an electromotive force acting on the torque motor shaft 5. There is a steady state dynamic feedback interaction between the electromotive force of the torque motor on the one hand and the shutter arm sensing system including the light source 9 and the light sensor 10. In the steady state dynamic condition, the torque motor shaft 5 continuously turns back and forth over a small angle, typically 1 or 2 degrees. Simultaneously, the shutter arm 7 continuously varies the intensity of the light beam 8 received by the light sensor 10.

Figure 4:
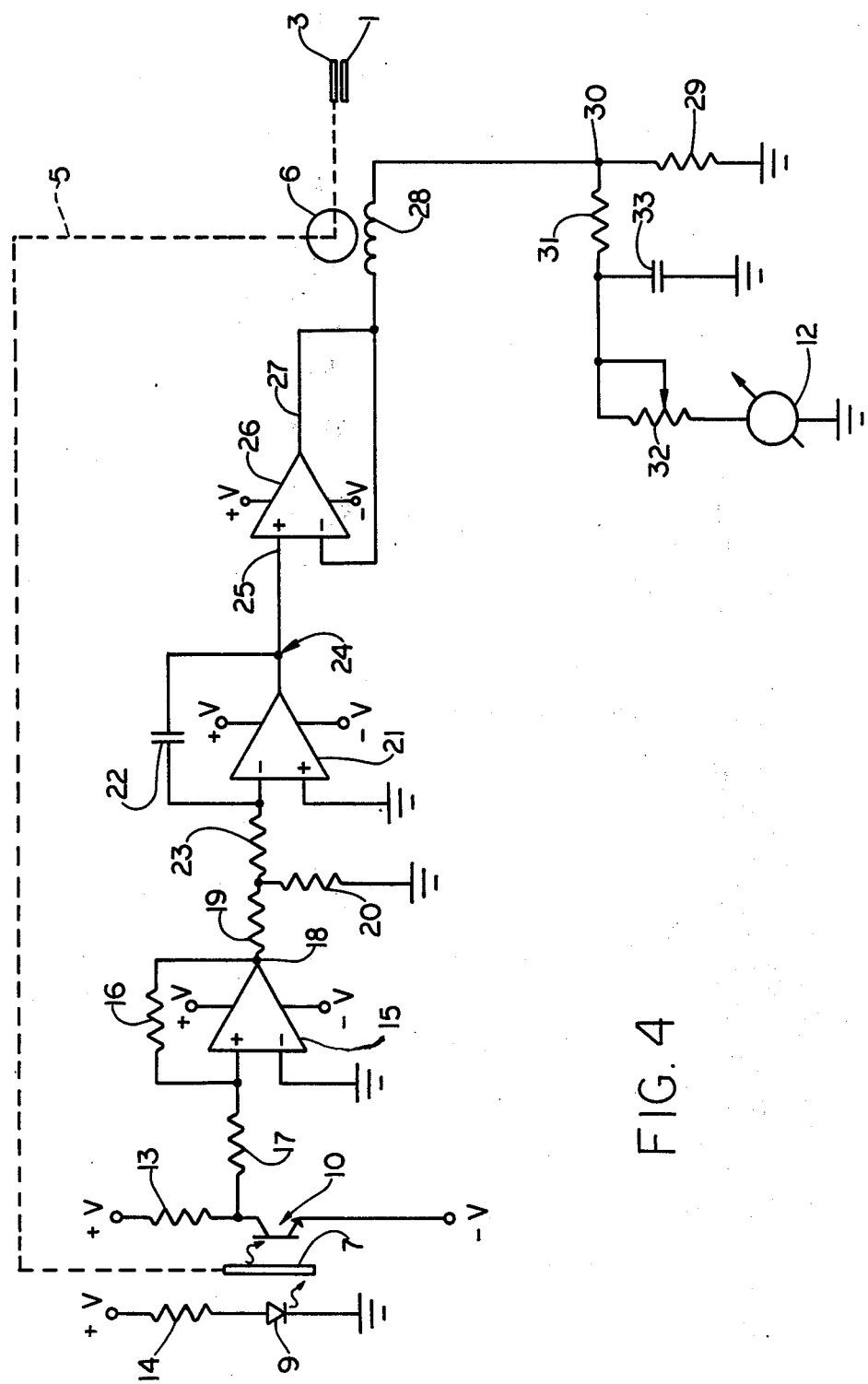
FIG. 4 is a schematic circuit diagram of the machine.

Operation of the clip testing machine will now be described in greater detail by reference to FIG. 4.

The light sensor 10 can be a phototransistor and is connected between voltage sources $+V$ and $-V$ by means of a resistor 13. The light source 9 can be a light emitting diode and is connected between the voltage source $+V$ and ground by means of a current limiting resistor 14.

An operational amplifier 15 is circuited as a positive feedback amplifier by resistors 16 and 17 and is connected to the collector of the phototransistor light sensor 10. The operational amplifier 15 increases the relatively small magnitude of voltage variation at the collector of the light sensor 10, which is caused by the steady state shutter arm movement and amplifies it to a large amplitude square wave at the output 18 of the amplifier 15. The square wave voltage amplitude at the output 18 swings approximately the $+V$ and the $-V$ voltage source potentials to which the amplifier 15 is connected.

Resistors 19 and 20, forming an attenuator network, connect the amplifier 15 to an integrating amplifier 21, which transforms the square wave voltage into a triangular wave voltage, by means of an integrating capacitor 22 and a resistor 23. The triangular wave at output 24 of the integrating amplifier 21 is connected to input 25 of a voltage follower amplifier 26, which also serves as a current amplifier. Output 27 of the amplifier 26 drives triangular wave current through a motor coil 28 of the torque motor 6. The motor coil 28 is connected in series with a current sensing resistor 29 to ground potential.

The triangular wave current through the coil 28 produces an electromagnetic force in the torque motor 6 whose shaft 5 produces the motion which causes the maintenance of the dynamic steady state equilibrium as described earlier. With no aneurysm clip mounted on the platforms 2 and 4 (no-load condition), the triangular wave at the output of the amplifier 26 swings symmetrically with respect to ground potential and the current through the coil 28 and through the current sensing resistor 29 is true alternating current without any direct current component. The voltage at the junction 30 is also true alternating voltage. The direct current voltmeter 12 is connected to the junction 30 via an adjusting resistor 32 and a series resistor 31 and registers no indication and its pointer (not shown) can rest at a zero mark. A filter capacitor 33 acts as a means to attenuate the triangular wave voltage so that the pointer of the voltmeter 12 does not vibrate at the rate of the triangular wave present at the junction 30. The voltmeter 12 can be calibrated in gram force and shows zero indication with no aneurysm clip mounted on the platform 2 and 4.

When the clamping force of the aneurysm clip 11 is applied to the platforms 2 and 4, the platforms 2 and 4 are pressed towards each other, and the gap between the platforms 2 and 4 closes to cause a slight counter-clockwise rotation of the motor shaft 5 and the shutter arm 7. As the shutter arm 7 swings slightly upward, more of the light beam 8 is permitted to pass to the light sensor 10. This action causes an immediate imbalance in the previously existing dynamic steady state no-load condition. As the light sensor 10 receives more light intensity, its collector voltage moves toward a more negative value. The output 18 of the amplifier 15 will now maintain a negative potential which in turn will cause the integrating amplifier 21 to produce a positively rising voltage at its output 24. The amplifier 26 will now drive more positive current through the coil 28 of the torque motor 6 until the electromechanical force on its shaft 5 overcomes the clamping force of the aneurysm clip 11. At this point the motor shaft 5 will rotate slightly clockwise and the shutter arm 7 will move back into the same position it held during the no-load dynamic state condition. A new dynamic steady state condition has now been established, but with a direct current component added through the motor coil 28 and the series current sensing resistor 29. This direct current component, flowing through the current sensing resistor 29, generates a direct current voltage at the junction 30, which is indicated by the voltmeter 12. The direct current component is linearly related to the magnitude of clamping force applied to the platforms 2 and 4. Thus, the voltage indicated by the voltmeter 12 is also a linear function of the clamping force applied to the platforms 2 and 4. If desired, the voltmeter can be calibrated in terms of gram force instead of voltage. The linear relationship between the gram force indicated by the voltmeter 12 and the clamping force applied to the platforms 2 and 4 can hold true within the linear torque capability of the torque motor 6.

The clamping force of the aneurysm clip 11 depends to some extent upon the point of contact between the jaws of the clip and edges of the platforms 2 and 4. As shown in FIGS. 2 and 3, the stationary platform carrier 1 is provided with a slot 35 in which a rack bar guide 36 is slideably mounted. A flat face 38 on the rack bar guide 56 slides on the platform 2. A pinion 40 is mounted on and adhesively attached to a shaft 42. The pinion 40 meshes with the rack bar guide 36. The shaft 42 is rotatably mounted in the platform carrier 1. A knob 43 mounted on the shaft 42 can be turned to advance the rack bar guide 36 to the right or left as shown in FIG. 3. The aneurysm clip 11 can be mounted on the platforms 2 and 4 with a free end of a jaw 48 of the aneurysm clip 11 engaging a free end of the rack bar guide 36. The rack bar guide 36 can be set at such a position that selected portions of the jaw 48 and a jaw 50 of the clip 11 are engaged by end portions of the platforms 2 and 4.

As shown in FIG. 1, the knob 43 can carry calibrations to indicate the position of the rack bar guide 36. Rotation of the knob 43 causes the rack bar guide 36 to advance or retreat and so provides an adjustable stop for the correct placement of aneurysm clips on the platforms 2 and 4.

The clip testing machine illustrated in the drawings and described above is subject to structural modification without departing from the spirit and scope of the appended claims.

Having described my invention, what I claim as new and desire to secure by letters patent is:

1. A machine for testing the force of an aneurysm clip which comprises a pair of jaw support platforms for receiving jaws of the aneurysm clip on end portions thereof, means for mounting one of said jaw support platforms for movement crosswise of a selected position in which said end portions of the jaw support platforms are in adjacent spaced relation, motor means for advancing said one of the jaw support platforms to open the clip, means for supplying electric current to the motor means to drive the motor means, and means for measuring the current in the motor means to provide a measure of the force on the jaws of the clip.

2. A machine as in claim 1 which includes a guide bar mounted on one of the jaw support platforms for engagement by an end of one of the jaws of the clip and means for advancing the guide bar toward and away from the end portion of said one of the jaw support platforms for positioning the clip at a selected position on said jaw support platforms.

3. A machine as in claim 2 in which the guide bar carries rack teeth, and the machine includes a pinion in mesh with the rack teeth and means for turning the pinion to advance the guide bar.

4. A machine as in claim 1 in which the means for supplying electric current to the motor means includes switching means, means for connecting the switching means to the movable jaw support platform to operate when the movable jaw support platform moves crosswise of the selected position, first circuit means controlled by the switching means to provide a signal potential which switches when the switching means operates, an integrating circuit receiving the signal potential and providing an integrated output potential which cycles as the switching means switches, and means controlled by said cycling integrated output for powering the motor means, whereby the motor means cycles to dynamically measure the force on the jaws of the clip.

5. A machine as in claim 4 in which the switching means includes a light source, a circuit including a light sensitive element positioned to be illuminated by the light source, a shutter bar connected to the movable jaw support platform and movable therewith to modulate illumination of the light sensitive element as the said one of the jaw support platforms moves crosswise of the selected position, and means connected to the light sensitive element to control the first circuit means.

* * * * *